United States Patent [19]
Weber

[11] 4,433,363
[45] Feb. 21, 1984

[54] AUDIO LIGHT CHANDELIER

[75] Inventor: Franz K. Weber, Canoga Park, Calif.

[73] Assignee: Modulite Corporation, Canoga Park, Calif.

[21] Appl. No.: 386,695

[22] Filed: Jun. 9, 1982

[51] Int. Cl.[3] .............................................. H04M 1/22
[52] U.S. Cl. ...................................... 362/86; 362/147; 362/234; 362/249; 362/252; 362/253; 362/362; 362/368; 362/404; 362/405; 362/806
[58] Field of Search ................. 362/86, 147, 234, 249, 362/252, 253, 362, 368, 404, 405, 806

[56] References Cited

U.S. PATENT DOCUMENTS 1,272,843 7/1918 Pape ...................................... 362/86
3,023,830 3/1962 Hammes ............................... 362/86

*Primary Examiner*—Stephen J. Lechert, Jr.
*Attorney, Agent, or Firm*—Gene W. Arant; Paul H. Ware

[57] ABSTRACT

A chandelier that has, in addition to its conventional illuminating purpose, an audio system such as a stereophonic radio or a security system incorporated into its structure, the former to furnish, for example, music, while the latter has as its purpose to warn of unwanted intrusions and disasters, for example, such a fires, by means of stimulus-responsive warning signals. Control, sensing and energizing means may be provided within a common housing. The modular construction of the device makes assembly and disassembly convenient without the use of special or any other kinds of tools.

9 Claims, 4 Drawing Figures

AUDIO LIGHT CHANDELIER

BACKGROUND OF THE INVENTION

Within the context of present technology it has been traditional to maintain each of lighting, audio, security and other entertainment and warning systems in separate physical housings and to energize and control each such system from its own separate physical location. It has not been the practice to centralize the physical housing, location and control of these kinds of systems. The purpose of a device such as is contemplated by the present invention is to combine the functional operations of lighting, audio and/or security systems in one conventional-appearing decorative housing such that the entertainment aspect of a stereo radio receiver may be controlled and enjoyed along with the control and enjoyment of lighting and security systems. According to the present invention, a system is provided in which audio, lighting and/or security systems may be combined in one decorative housing that will be useful in homes, industrial plants and the like, housed in an economical and convenient central control station.

The general form of the audio light chandelier may include a plurality of horizontal arms, usually disposed at about equal angular intervals about a central housing member. Decorative appearance is almost as important an aspect of any lighting fixture as is functional operation and this is particularly true for a chandelier. An important functional and utilitarian feature of the audio light chandelier is its utilization of the structure supporting the light fixtures as resonance chambers for an included audio system.

SUMMARY OF THE INVENTION

The audio light chandelier of the present invention is constructed in a modular fashion wherein a central housing member supports a number of arms such that included systems may all be controlled from a central location within the general housing thereof. Assembly of modules is straightforward and may be accomplished by any person possessing average dexterity.

In the preferred form of the invention, the structure of the chandelier is supported by a hang chain which may be suspended from a ceiling and which hang chain is in turn connected to a transition link supporting the central housing member. In general, the system-carrying chandelier arms are disposed in an axial direction normal to the central housing member. It is contemplated that the central housing member contain the systems controls that may be manipulated from underneath the structure and that the lighting, audio and/or sensing output portions of the structure will be mounted in the horizontal arms. An important feature of the invention is that all the incorporated systems may be controlled from the central location provided in the housing member.

An additional important feature of the invention is that the same mechanical structure that physically supports the lighting feature of the chandelier also provides resonance chambers for the audio systems of the device.

DRAWING SUMMARY

PREFERRED EMBODIMENT

Advantages and features of the present invention will be fully apparent to those skilled in the art to which the invention pertains from the ensuing detailed description thereof regarded in conjunction with the accompanying drawings.

Although a specific embodiment of the invention will be described with reference to the drawings, it should be understood that such embodiment is by way of example only and merely illustrative of the many possible specific embodiments which can represent applications of the principles of the invention. Various changes and modifications, obvious to one skilled in the art to which the invention pertains, are deemed to be within the spirit, scope and contemplation of the invention as further defined in the appended claims.

Figure 1:
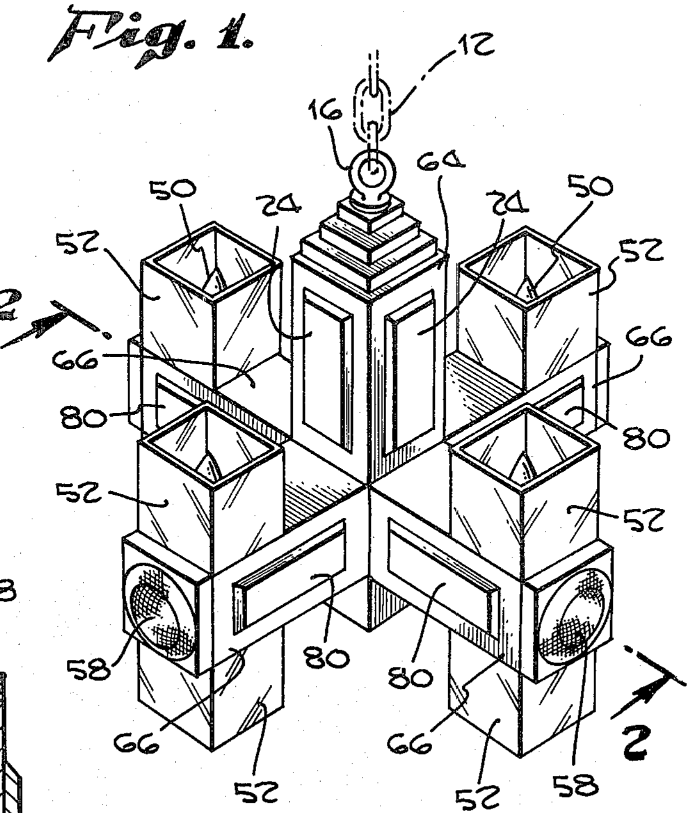
FIG. 1 is an idealized perspective view of a ceiling mounting device such as is contemplated by the invention.

Referring to FIG. 1 with greater particularity there is shown an idealized perspective of a ceiling mounted device such as is contemplated by the invention. A hang chain 12, attached to a ceiling, supports a transition link 16 which through its internal mechanism supports a vertical central housing member 64. The vertical central housing member 64 incorporates decorative panels 24. It has been previously noted that the aesthetic aspect of chandeliers such as the one presented herein is of primary importance, thus, the decorative panels 24 as shown in the vertical member and decorative panels 80 as shown in the horizontal members.

For illustrative purposes and by way of example, the embodiment shown contemplates four horizontal arms radially disposed with respect to the axis of a central vertical member. Each radial arm 66 of the device as shown supports two lighting fixtures. Lampshades 52 may be fabricated of glass, thermal setting plastic, or of some such convenient material. In addition, each radial arm may include sensing and audio system components. Each arm is typical of all except with respect to placement of a sound baffle, therefore, the following discussion will apply to all. There is also shown a typical decorative cover for the audio system devices which cover is denoted by the numeral 58.

Figure 2:
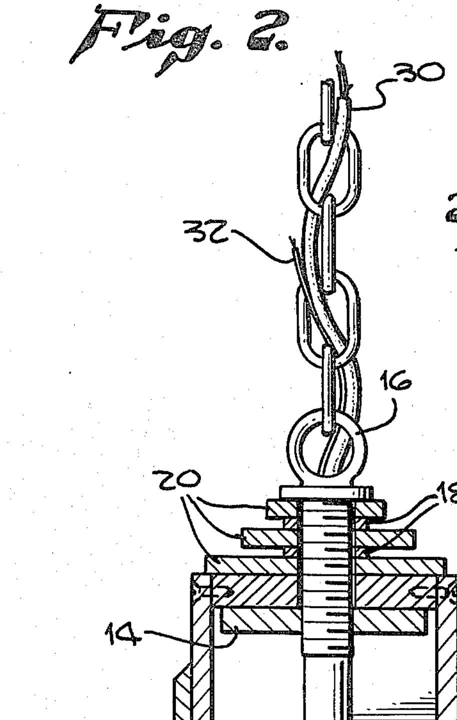
FIG. 2 is an enlargement in cutaway cross-section taken along the sight lines 2—2 of FIG. 1 showing representative wiring details.
Figure 2:
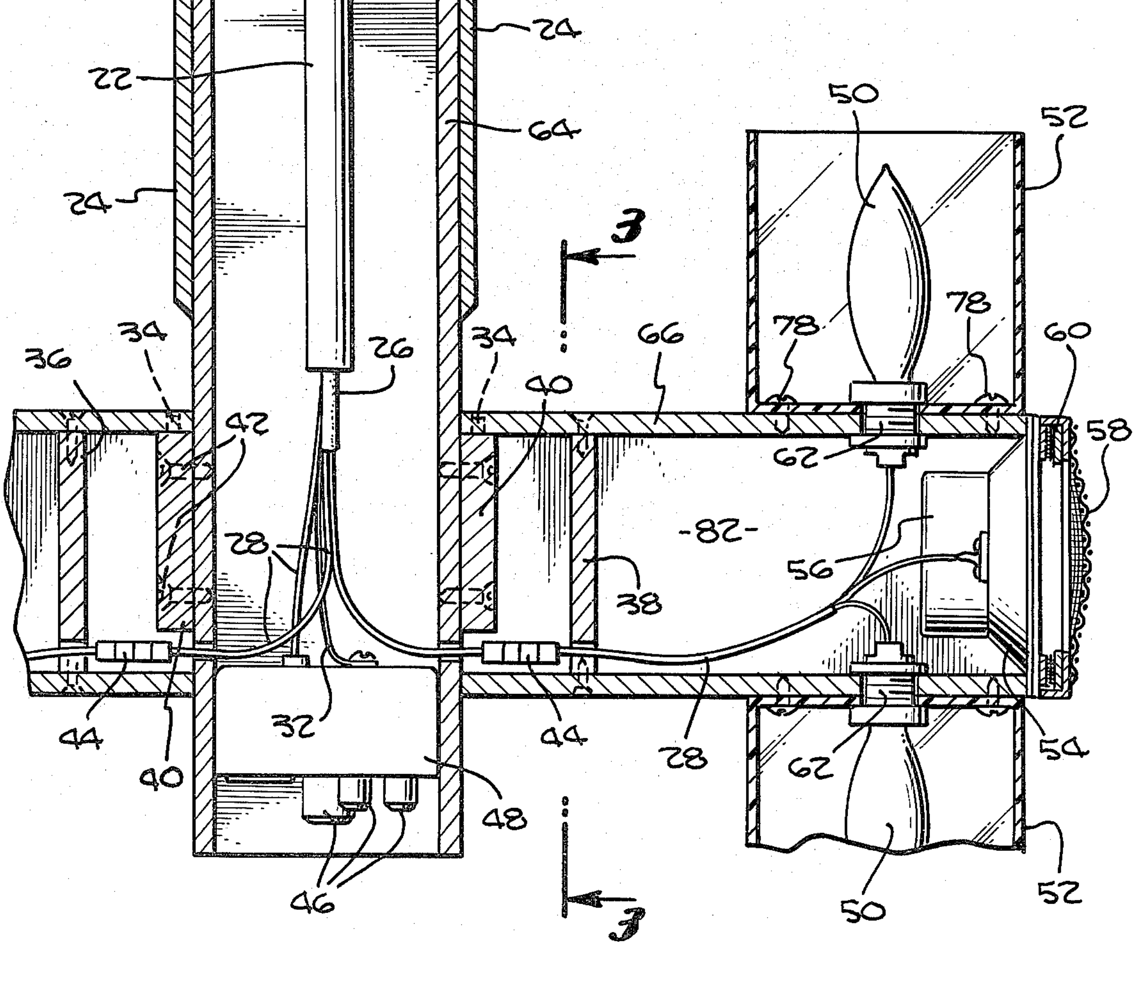

Referring now to FIG. 2, it may be observed that power cable 30 and antenna 32, have been threaded through hang chain 12 and through transition link 16 so as to be disposed within the interior of central housing member 64. It may be noted that cable sheath 26 has been extended so as to protect the incorporated cables denoted by the numeral 28 and which numeral identifies the power and accessory control cables provided for operation of the system.

Typical horizontal arm 66 may typically be disconnectedly attached to central housing member 64 by means of hang block 40, itself attached to central housing member 64 by means of screws 42 and having incorporated into its structure holding pins 34 for the attachment of said horizontal arm 66. The horizontal arms have position holes located so as to accept the holding pins 34 and to retain said horizontal arm in cantilevered engagement with said vertical central housing member 64. Before attachment of representative horizontal arm 66, electrical and signal connections may be made to the central housing system by means of typical connectors 44.

It is well known in the audio art that resonance acoustic cavities having various physical lengths are responsive in a selective manner to the higher or lower sound frequencies in proportion to those lengths. In FIG. 2 such a resonance acoustic cavity 82 is defined by first low frequency baffle member 38, situated as shown and the audio output device or loudspeaker 54 located near to the other longitudinal extremity of low frequency resonance acoustic cavity 82. Numeral 58 denotes a decorative cover for the audio output device 54. As shown in the Figure this decorative cover 58 may be attached to the end of horizontal arm 66 by means of Velcro pads 60. Velcro is a trademark of Velcro U.S.A., Inc. An electro audio transducer for audio output device 54, transducing mechanical energy into electrical energy or electrical energy into mechanical energy, as the case may be, and as has been well demonstrated in the art, is denoted by the numeral 56.

For purposes of furnishing light, a light fixture comprising a lamp 50 situated in a lamp socket 62 and covered by lamp shade 52 may be attached to horizontal arm 66 by means of fastening screws 78. Second low frequency baffle 36 is shown in the oppositely located horizontal arm. Numeral 48 denotes the housing for audio and detection systems as contemplated by the invention while the system controls are denoted generally by numeral 46.

Figure 3:
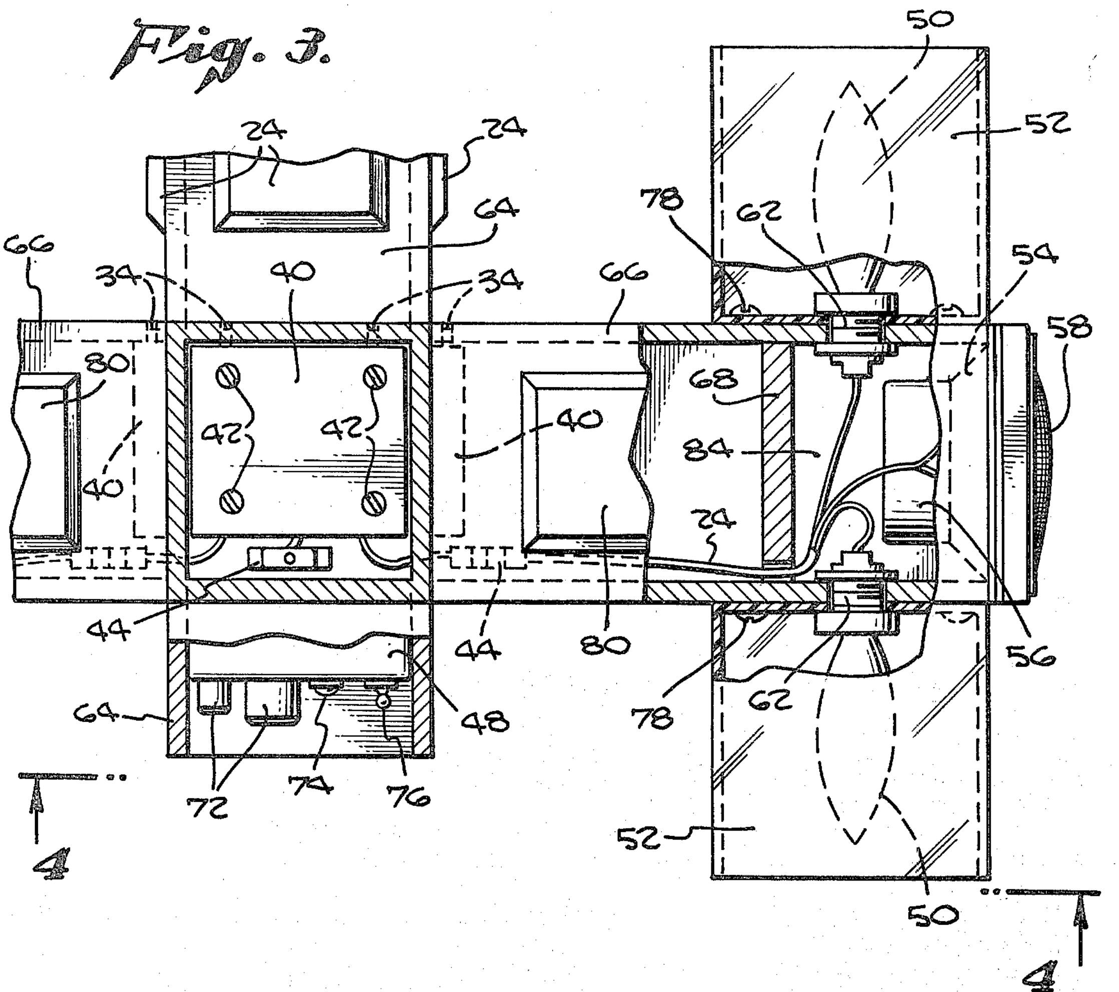
FIG. 3 is an enlargement partially in cutaway cross-section taken along the sight line 3—3 of FIG. 2.

Referring now to FIG. 3, it will be noted that high frequency resonance cavity 84 has a much shorter dimension in the direction of propagation and wave length of audio information to be processed by the audio output device 54. This shorter dimension has been accomplished by placing high frequency baffle 68 closer to the electro audio transducer 54, 56. It is contemplated that the horizontal arms forming the high frequency resonance cavities and those forming the low frequency resonance cavities will be alternately positioned about the vertical central housing member. In that fashion, for a four-arm chandelier, the horizontal arms forming the low frequency resonance cavites will be displaced one hundred eighty degrees (180°) from each other, as will be the horizontal arms forming the high frequency resonance cavities. In FIG. 3, control knobs 72 and control indicator lamps 74 along with system control switches 76 can be distinguished more readily than in FIG. 2.

Figure 4:
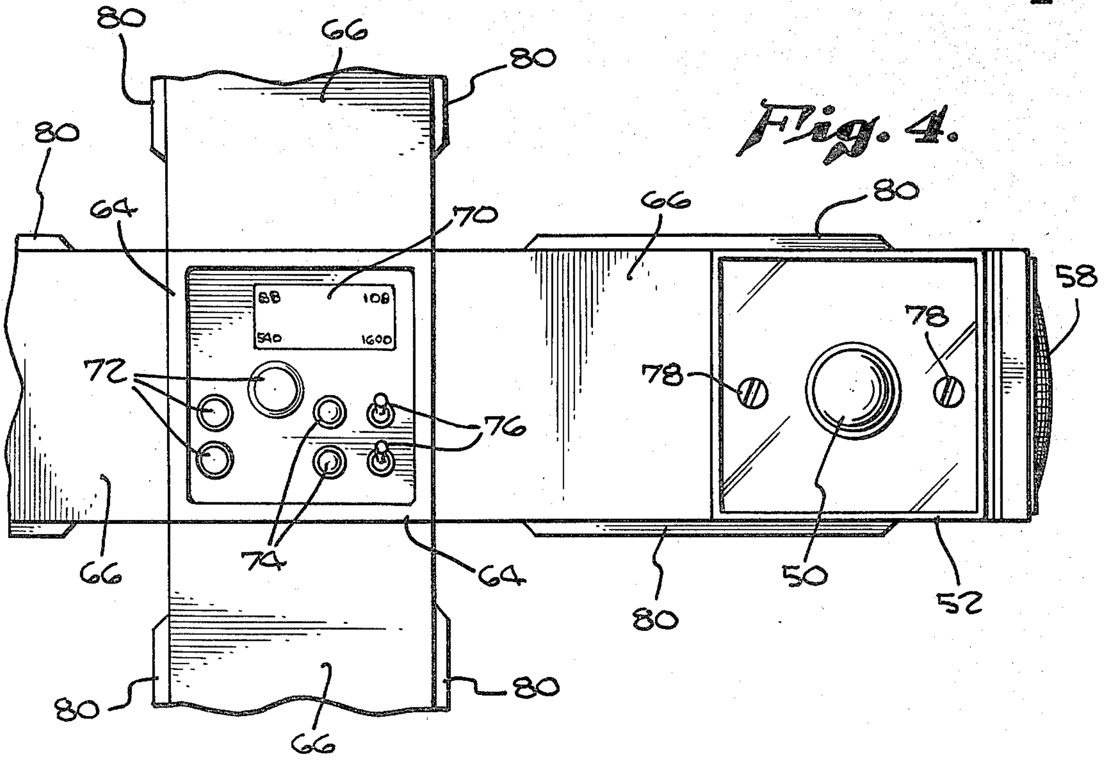
FIG. 4 is an underside view taken along sight lines 4—4 of FIG. 3, showing representative details of radio and other system controls such as may be incorporated into the inventive device.

Turning now to FIG. 4, there is presented an underside view of the control station of the system. Since the inventive device contemplates both illumination and audio systems, there has been incorporated for exemplary purposes a radio dial indicator 70 indicatively responsive to the manipulation of one of control knobs 72. Only a few typical control knobs 72, indicator lamps 74 and system control switches 76 have been shown, however, such showing is not intended to limit the number of such control or indicator devices that may be incorporated into the structure of the inventive device.

Thus there has been shown a system that may be highly decorative, that may be assembled by an ordinary customer by means of attaching the horizontal arms to the central housing member by means of hang blocks, pins and position holes, and which may incorporate an audio system as well as an illumination system.

While not specifically shown in the present drawings, said audio system may be utilized for purposes of entertainment, such as music, warning of a hazardous condition such as smoke or fire and/or for purposes of warning of an unwanted intrusion, in accordance with the well-known art. The centralization of control and location of these systems has been shown through the novel advantages of the invention.

It is here pointed out that although the present invention has been shown and described with reference to particular embodiment, nevertheless, various changes and modifications obvious to one skilled in the art to which the invention pertains are deemed to lie within the purview of the invention.

What is claimed and desired to be secured by Letters Patent of the United States is:

1. A composite illumination and audio system comprising, in combination:
- a mechanical structure adapted to be suspended from a wall or ceiling;
- an illuminating system supported by said mechanical structure;
- an audio system also supported by said mechanical structure;
- said mechanical structure providing a resonant cavity for said audio system; and
- an electrical power supply circuit for furnishing electrical power both to said illuminating system and to said audio system.

2. An audio light chandelier which comprises:
- a central housing member;
- means for mounting said central housing member to a wall or ceiling;
- means to supply electrical power to be distributed into said central housing member;
- radio signal sensing means distributed into said central housing member;
- an audio and detection system connected and responsive to said radio signal sensing means;
- means to control said audio and detection system;
- a plurality of horizontal arms radially disposed with respect to the axis of said central housing member and disconnectedly attached thereto;
- at least one lighting fixture attached to each of said horizontal arms;
- a resonance acoustic cavity formed within the interior dimensions of said horizontal arms; and
- an electro-audio transducer situated in each of said horizontal arms.

3. The audio light chandelier of claim 2
- wherein said horizontal arms are disconnectedly attached to said central housing member by means of:
- hang blocks in turn attached to said central housing member by means of screws; and
- holding pins for cantileveredly securing said horizontal arms to said central housing member through the use of position holes located in said horizontal arms.

4. The audio light chandelier of claim 2 wherein said means to supply electrical power includes connection means for distributing said electrical power into said horizontal arms.

5. The audio light chandelier of claim 2 wherein said resonance acoustic chamber includes a baffle, location of which determines the acoustic response characteristics of said resonance acoustic chamber.

6. A composite illumination and audio system comprising, in combination:

a hollow central housing member;

means for suspending said central housing member from above;

a plurality of horizontally disposed hollow arms secured to and extending radially outward from said central housing member in symmetrically arranged positions;

a plurality of loudspeakers, each secured within the outer end of a corresponding one of said arms;

each of said arms containing an interior baffle, said baffle and the associated loudspeaker forming a resonance chamber within said arm;

a set of lamp holders, each being supported on the outer end of one of said arms and extending vertically therefrom;

music circuit means disposed within said central housing member and electrically coupled to all of said loudspeakers; and energizing circuit means contained within said suspending means and coupled to said music circuit means for energizing the same, and also coupled through said central housing member and said arms to each of said lamp holders for providing energy thereto.

7. In a combined illumination and audio system:

an elongated hollow arm;

means for releasably attaching one end of said arm to a central housing member;

a loudspeaker disposed within and secured to the other end of said arm;

a baffle transversely disposed within said arm, said baffle and loudspeaker together forming a resonance chamber;

said arm having an opening in its side wall;

a lamp socket supported in said side wall opening;

said baffle having an opening therein; and an electrical cable extending from said one end of said arm through said baffle opening towards said other end of said arm, and being connected to both said lamp socket and said loudspeaker.

8. Apparatus as claimed in claim 7 wherein said arm is of square cross-sectional configuration and has walls made of wood.

9. Apparatus as claimed in claim 6 which further includes control means positioned on the bottom of said central housing member for controlling said music circuit means.

* * * * *